(12) United States Patent
Thiel

(10) Patent No.: US 6,450,700 B2
(45) Date of Patent: Sep. 17, 2002

(54) COUPLING ELEMENT FOR CONNECTING AN ELECTRICAL APPARATUS TO AN OPTICAL DATA BUS

(75) Inventor: Christian Thiel, Brannenburg (DE)

(73) Assignee: Bayerische Motoren Werke Aktiengesellschaft, Munich (DE)

(*) Notice: Subject to any disclaimer, the term of this patent is extended or adjusted under 35 U.S.C. 154(b) by 0 days.

(21) Appl. No.: 09/817,174

(22) Filed: Mar. 27, 2001

(30) Foreign Application Priority Data

Apr. 15, 2000 (DE) .......................................... 100 18 719

(51) Int. Cl.⁷ ................................................ G02B 6/36
(52) U.S. Cl. ............................ 385/88; 385/24; 385/39
(58) Field of Search ............................ 385/88, 24, 14, 385/15, 39, 40

(56) References Cited

U.S. PATENT DOCUMENTS

| | | | |
|---|---|---|---|
| 5,202,940 A | * | 4/1993 | Betts .......................... 359/154 |
| 5,357,588 A | * | 10/1994 | Marcel et al. ................. 385/16 |
| 5,475,778 A | * | 12/1995 | Webb .......................... 264/1.25 |
| 5,615,292 A | * | 3/1997 | Beckwith ...................... 385/89 |
| 6,229,712 B1 | * | 5/2001 | Munoz-Bustamante et al. . 174/260 |

FOREIGN PATENT DOCUMENTS

EP          0 245 153          11/1987

* cited by examiner

Primary Examiner—Brian Sircus
Assistant Examiner—Brian S. Webb
(74) Attorney, Agent, or Firm—Crowell & Moring LLP

(57) ABSTRACT

A coupling element is provided for connecting an electrical apparatus to an optical data bus with a unidirectional transmission. A housing contains an opto-electrical transducer to which an input data bus line is optically connected, an electro-optical transducer to which an output data bus line is optically connected, and two electrical contacts on an exterior side, by way of which the two transducers can be electrically connected with the electrical apparatus. A switchable electrical connection is provided between the two transducers which, when the electrical apparatus is connected, is open and, when the apparatus is not connected, is closed.

14 Claims, 1 Drawing Sheet

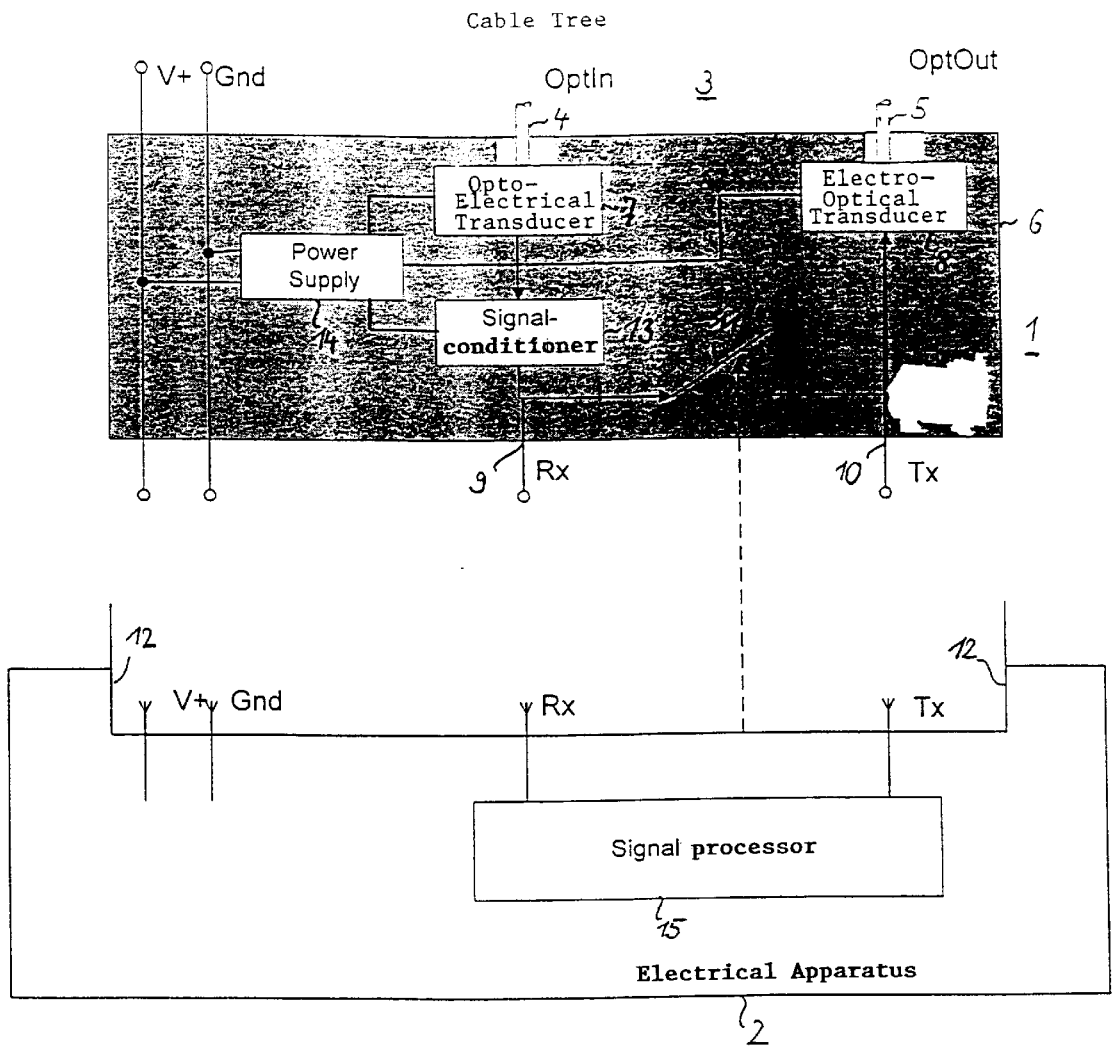

COUPLING ELEMENT FOR CONNECTING AN ELECTRICAL APPARATUS TO AN OPTICAL DATA BUS

BACKGROUND AND SUMMARY OF THE INVENTION

This application claims the priority of German Application No. 100 18 719.6, filed Apr. 15, 2000, the disclosure of which is expressly incorporated by reference herein.

The invention relates to a coupling element for connecting an electric apparatus to an optical data bus with a unidirectional transmission.

In the case of electrical apparatuses, which are connected to conventional optical data buses, an optical receiver (opt-in), as a component of an opto-electrical transducer, and an optical transmitter (opt-out), as a component of an electro-optical transducer, are situated in the interior of each apparatus. The two transducers are used for transmitting the data telegrams incoming from the data bus to the apparatus and for transmitting the outgoing data telegrams to the data bus.

For this purpose, one optical interface between the data bus and the electrical apparatus, respectively, must be implemented for each of the two transducers. This interface has to be designed using high-cost constructive measures to accommodate many plug-in cycles since the apparatuses must be frequently unplugged and plugged in again (service). In addition, this interface is susceptible to dirt and other environmental influences (chemicals, deposits . . . ). It must be protected by means of high-cost mechanical constructions.

It is another disadvantage that optical elements are placed in the interior of the electrical apparatuses. The optical system is sensitive to high temperatures generated in the interior of many apparatuses. The apparatuses must be cooled by high-cost measures (cooling constructions, fans . . . ) In addition, the optical elements are not equally suitable for automatic manufacturing processes. During the processing, high-cost and expensive special processes must be carried out. If the supply voltage of an apparatus fails or if the apparatus is not (or not correctly) plugged in, particularly in the case of optical ring buses, the entire bus is incapacitated because an incoming optical signal can no longer be transported to the user in the following bus.

It is an object of the present invention to provide a coupling element of the above-mentioned type, which is simple and robust with respect to its handling and which can be used particularly in a highly stressed environment. In particular, it should be suitable for a use in a motor vehicle.

The invention achieves this object by providing a coupling element for connecting an electrical apparatus to an optical data bus with a unidirectional transmission, characterized in that a housing contains an opto-electrical transducer to which an input data bus line is optically connected, and an electro-optical transducer to which an output data bus line is optically connected. Also, two electrical contacts are provided on the exterior side, by way of which the two transducers with the apparatus can be electrically connected. Further, a switchable electrical connection is provided between the two transducers which, when the apparatus is connected, is open and when the apparatus is not connected, is closed.

The optical elements, particularly the optical receiver and the optical transmitter are integrated in the coupling element. An "active optical coupling element" is created in this manner. If the coupling element is unplugged from the apparatus, the electric output signal of the opto-electrical transducer is guided directly onto the electro-optical transducer. If the coupling element is plugged to the apparatus, the electric connection of the two transducers is separated by way of the (mechanical or electronic) switch. The output signal of the opto-electrical transducer is guided into the apparatus for processing. The electric output signal of the apparatus is fed to the data bus by way of the electro-optical transducer.

The power supply of the two transducers advantageously takes place independently of whether the coupling element is arranged on the apparatus. The electrical connection lines therefor end, like the optical waveguides, in the coupling element. The elements which may be additionally required for the power supply of the two transducers, such as adapter elements, amplifiers, etc., can also be arranged in the coupling element. As a result, an integrated power supply system for the two transducers is obtained.

The power supply system can have separate connection contacts. Furthermore, when the coupling element is arranged, a power supply (for example, +12V and Gnd) can be represented by way of the coupling element for the apparatus.

The two data bus lines connected with the transducers can be non-detachably connected with the latter, for example, they may be cast-in. This further reduces the danger of contamination.

The electrical connection between the two transducers can be switched using a proximity switch which responds when the apparatus is present. Such proximity switches operate reliably and require little space and no additional electrical control connections.

Advantageously, the active optical coupling element additionally contains a signal processing unit which generates the output signal of the opto-electrical transducer such that an ideal pulse-pause ratio with a low pulse duration distortion is obtained.

Arbitrary exit angles of the optical cables can easily be implemented because the required bending can be implemented on the electrical side and thus with an arbitrarily small bending radius.

The invention increases the amount of security. The operation, even of a ring bus, is no longer interrupted by the unplugging of an apparatus because the signal is shortcircuited in the coupling element and the incoming optical signal is regenerated and forwarded to the apparatus which follows.

Other objects, advantages and novel features of the present invention will become apparent from the following detailed description of the invention when considered in conjunction with the accompanying drawings.

BRIEF DESCRIPTION OF THE DRAWING

The single FIGURE is a schematic view of the construction of a coupling element according to the present invention for connecting an electrical apparatus to an optical data bus.

DETAILED DESCRIPTION OF THE DRAWING

A coupling element 1 is used for connecting an electrical apparatus 2 to a data bus 3 with a unidirectional transmission. The data bus 3 is shown in a cutout-type manner and has two optical waveguides 4 and 5 which lead to the coupling element 1 (Opt In 4) and away from the latter (Opt Out 5).

The coupling element 1 has a housing 6 into which the optical waveguides 4 and 5 are cast. In addition, an opto-electrical transducer 7 to which the optical waveguide 4 is connected, and an electro-optical transducer 8 to which the optical waveguide 5 is optically connected are provided.

On the exterior side of the housing 6, two electrical contacts 9 and 10 (only outlined) are located by way of which the two transducers 7 and 8 can be electrically connected with the electrical apparatus 2. The electrical output Rx 9 of the coupling element 1 is electrically connected with the input of the electrical apparatus 2 which has the same reference designation. The electrical input Tx 10 of the coupling element 1 is electrically connected with the output of the electrical apparatus 2 which has the same reference designation.

A switchable electrical connection 11, which is open when the electrical apparatus 2 is connected and is closed when the electrical apparatus 2 is not connected, exists between the two transducers 7, 8. When the electrical apparatus 2 is connected, the coupling element 1 is situated in a recess 12 of the apparatus 2. The switchable electrical connection 11 contains a proximity switch which then responds and interrupts the connection 11 (illustrated via dashed arrow).

Inside the coupling element 1, a signal processing unit 13 is situated, which regenerates the signal of the electric data output of the transducer 7 such that an ideal pulse-pause ratio is generated. This ideal pulse-pause ratio has a low pulse width distortion. In addition, an integrated power supply system 14 for the two transducers 7 and 8 is provided in the coupling element 1. The power supply system 14 is supplied by an external source V+,Grd. When the coupling element 1 is connected, the electrical apparatus 2 is thereby also supplied with power.

When the coupling element 1 is connected, the electrical apparatus 2 is connected with the data bus 3. It receives the first incoming optical telegrams, electrically converted by way of the transducer 7 and treated by way of the signal processing unit 13, in a signal processing stage 15 and transmits them by way of the transducer 8 as an optical telegram to the data bus 3.

When the coupling element 1 is not connected, the electrical apparatus 2 is not connected with the data bus. The first incoming optical telegrams are electrically converted by way of the transducer 7 and, treated by way of the signal processing unit 13, are transmitted to the transducer 8 via switch 11. The transducer 8 transmits them as an optical telegram to the data bus 3.

The entire optical system is implemented in the coupling element 1. No optical interface is generated which is subjected to several plug cycles. The plugging takes place on the electrical side between the contacts 9, 10 and those on the apparatus 2. This is a standard problem which nowadays is excellently controlled. The entire sensitive optical system is therefore encapsulated in the coupling element 1. Environmental influences, such as contamination, chemicals, etc. are completely excluded. In the processing operation, for example, manufacturing, customer service, etc., the optical character of the data transmission (by way of the optical data bus) is hardly noticeable.

The handling is again based on known good and controlled electrical interfaces. The temperature-susceptible optical system is removed from the hot interior of the electrical apparatuses, so that no more unusual measures have to be taken for cooling. High-cost processing operations of the optical system during the manufacturing of the electrical apparatuses can be eliminated.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coupling element for coupling an electrical apparatus to an optical data bus having a unidirectional transmission, the coupling element comprising:

a housing;

an opto-electrical transducer contained in the housing and to which an input data bus line is optically connected;

an electro-optical transducer contained in the housing and to which an output data bus line is optically connected;

two electrical contacts arranged on an exterior side of the housing, said two electrical contacts being adapted to electrically couple the transducers with the electrical apparatus; and a switchable electrical connection arranged between the transducers, said switchable electrical connection being open when the electrical apparatus is coupled with the coupling element and being closed when the electrical apparatus is not coupled.

2. The coupling element according to claim 1, further comprising a power supply system integrated in the coupling element, said system providing power for the transducers.

3. The coupling element according to claim 2, further comprising separate electrical connection contacts, said separate electrical connection contacts being adapted to supply power to the electrical apparatus.

4. The coupling element according to claim 1, wherein said input and output data bus lines are non-detachably connected with their respective transducers.

5. The coupling element according to claim 2, wherein said input and output data bus lines are non-detachably connected with their respective transducers.

6. The coupling element according to claim 3, wherein said input and output data bus lines are non-detachably connected with their respective transducers.

7. The coupling element according to claim 4, wherein said non-detachable connection is a cast connection.

8. The coupling element according to claim 5, wherein said non-detachable connection is a cast connection.

9. The coupling element according to claim 6, wherein said non-detachable connection is a cast connection.

10. The coupling element according to claim 1, further comprising a proximity switch for controlling the switchable electrical connection between the transducers.

11. The coupling element according to claim 2, further comprising a proximity switch for controlling the switchable electrical connection between the transducers.

12. The coupling element according to claim 3, further comprising a proximity switch for controlling the switchable electrical connection between the transducers.

13. The coupling element according to claim 4, further comprising a proximity switch for controlling the switchable electrical connection between the transducers.

14. The coupling element according to claim 7, further comprising a proximity switch for controlling the switchable electrical connection between the transducers.

* * * * *